United States Patent Office 2,938,549
Patented May 31, 1960

2,938,549

STRAIGHTENING AND SEVERING OF WIRES

Alexander Rizo Rangabe, Denmead, and Edmund Green Perry, Southsea, England, assignors to The Plessey Company Limited, Ilford, England, a British company Filed Aug. 23, 1957, Ser. No. 679,999

7 Claims. (Cl. 140—140)

The present invention relates to the straightening and has for an object to provide an improved method of making wires suitable for use in the automatic assembly of small wire-ended components such as resistors, condensers, or valve components. Such wire elements are required to be straight and must sometimes be threaded with little clearance into fine bores or like apertures.

Hitherto difficulty has been encountered as regards each of these requirements. More particularly if the wires were cut to length by a clipping or shearing tool as hitherto customary, this resulted in deformation of the ends liable to foul a narrow clearance bore.

The present invention has also for an object to reduce the risk of such fouling. According to the invention the wire end is severed by longitudinal pull. This results, prior to the actual break, in contraction of the cross-section adjacent the severing point, so that the severed end will have a lead-in taper. In order to ensure severing at the desired point, the wire is grasped by suitable jaws at close distance to each side of said point to exert the pull. The jaws or their equivalent should be so constructed as to produce as little permanent squeeze deformation of the cross section as possible.

According to a further feature of the invention the tendency of the wire to curl can be greatly reduced if prior to the severing operation the whole length of the straight wire element is subjected to a moderate amount of stretching by applying to it a pull in excess of the yield point.

The apparatus for carrying out the above-described method also forms an aspect of the invention.

In order that the invention may be more readily understood, it will now be described by way of example with reference to the accompanying drawings.

Figure 1:
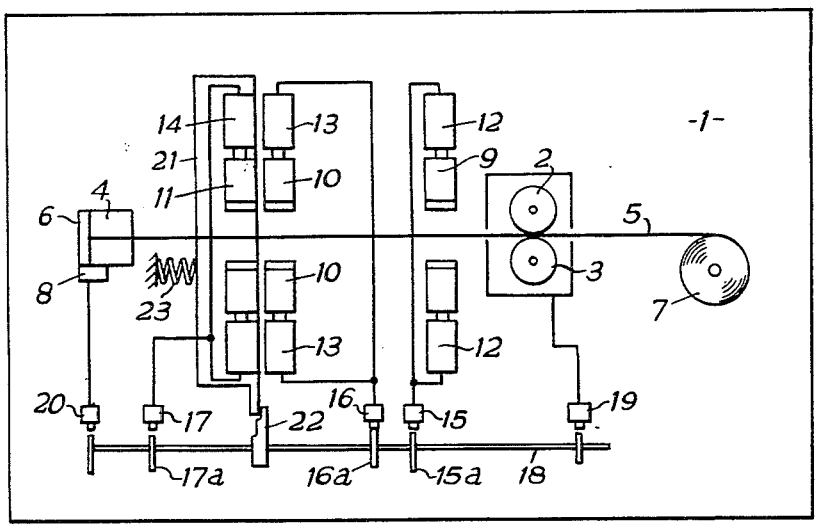
Figure 1 is a plan view showing, somewhat diagrammatically, one form of apparatus suitable for carrying out the invention.
Figure 2:
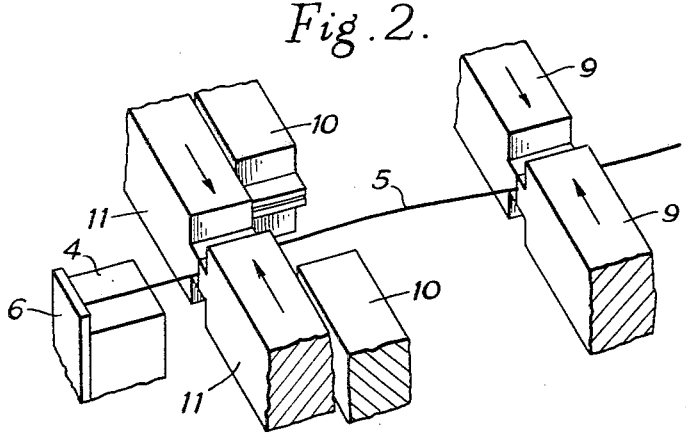
Figures 2, 3 and 4 are perspective views showing the operative parts of the apparatus in different phases of a cycle of operation.
Figure 3:
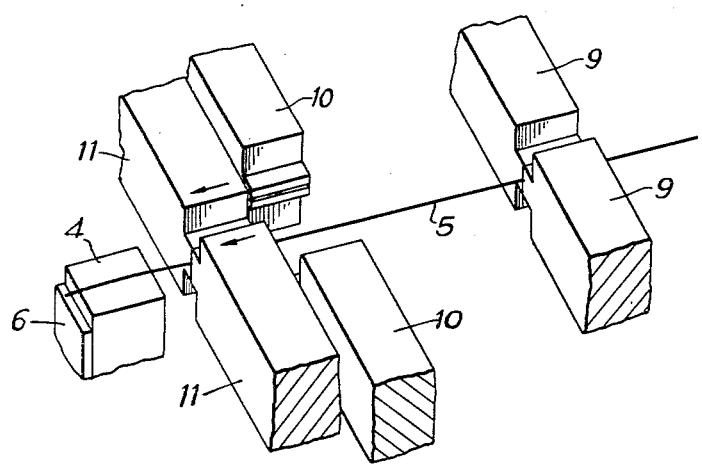
Figure 4:
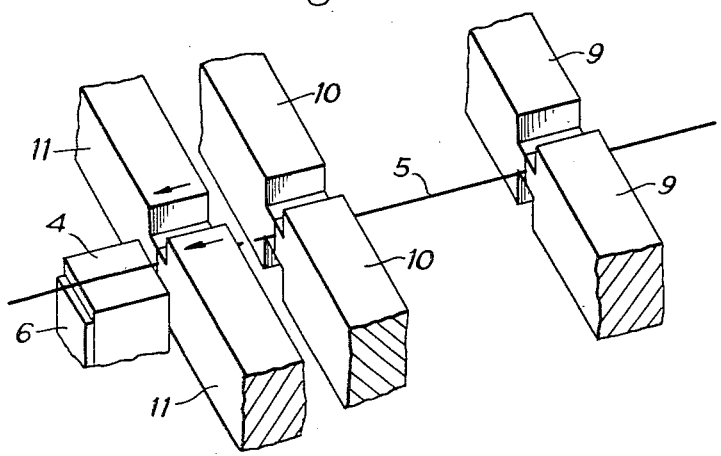

The apparatus is mounted on a base plate 1 and comprises a wire-feeding device having a pair of feed rollers 2 equipped with an electric motor drive 3, a table 4 for supporting the end of the length of the wire 5 supplied by the feed rollers 2 from a supply spool 7, and a stop 6 for terminating the feed movement, which can be withdrawn by means of an electric-magnetic device 8. Spaced along the wire between the feed rollers 2 and the table 4 are three pairs of gripping jaws 9, 10 and 11, each pair with electromagnetic means 12, 13 or 14 for causing the pair of jaws to grip the wire 5. Each pair of the actuating magnet devices 12, 13 and 14 is controlled by an electric contact device 15, 16, or 17 actuated by cams 15a, 16a, 17a on a common cam shaft 18 which also operates two further contact devices 19 and 20 for controlling the movement of the feed rollers 2 and for moving the end stop 6 into and out of operative position. The termination of the feed roller movement is additionally controlled by an auxiliary circuit including the wire 5 and the stop member 6 in order to terminate the feed as soon as the end of the wire 5 strikes the stop member 6. While the actuating devices 12 and 13 for gripping jaws 9 and 10 are fixed on the base plate 1, the actuating device 14 for the jaws 11 is mounted on a movable carriage 21 which can be moved, in the direction of the wire 5, towards the end stop 6 by a two-step cam member 22 on shaft 18 in order to effect the stretching of the wire in a manner which will be described in more detail further below. A spring 23 serves to return the carriage 21 to the illustrated position at the end of each cycle. The operation is as follows. After a predetermined length of wire has been fed by the rollers 2 and struck the stop 6, thereby terminating the feed movement, the jaw-actuating devices 12 and 14, are operated for the jaws 9 and 11 to grip the wire. As shown in Figures 1 and 2 the carriage is at this time in its innermost position with the jaws 10 and 11 closely adjacent to each other. The stop 6 is then withdrawn by its mechanism 8, and the cam 22 causes the carriage 21 to be moved away from the jaws 10 by a first step of movement to the position shown in Fig. 3, whereby the length of wire gripped by the jaws 9 and 11 is stretched sufficiently to exceed the yield point by a small amount. This stretching substantially removes in the length of wire thus treated any tendency to curl so that after severing the wire element will remain straight. The contact device 16 is then actuated by its cam 16a to energize the magnet devices 13, whereupon the last set of jaws 10 will also grip the wire firmly, while the tension produced by the first step of movement of the carriage 21 is maintained. Thereafter the second step of the cam 22 becomes effective to move the carriage 21, against the action of spring 23, a further step towards the table 4, by an amount sufficient to break the stretched wire between the jaws 10 and 11 (see Fig. 4). This breakage occurs, in the manner well-known from tensile testing samples, under local constriction of the cross-section, thereby not only avoiding the formation of any burr but actually leaving the severed ends tapered, which, more particularly in view of the elimination of curling tendencies by the previous stretching of the wire, will greatly facilitate threading the severed wire into, for example, a bore of an electrode support for a thermionic valve.

All jaws are now allowed to open, and the severed wire element is removed or allowed to drop into a suitable container or the like, whereafter further movement of the cam 22 permits the carriage 21 to return to its initial position, while the contact device 19 initiates the next feed movement of the wire 5. It will be appreciated, that, provided the first length of a supply of wire from spool 7 is discarded, each severed section has previously been straightened between the jaws 9 and 10, so that from then on all the wire elements obtained are straight and provided with lead-in tapers at each end.

The invention may be modified in some details within its scope. Thus the stretching to straighten the wire could be effected by movement of the jaws 9, thus leaving the spacing of jaws 10 and 11 unaltered until the jaws 11 are moved to sever the wire.

What we claim is:

1. In a method of producing a straight length of wire having at least one burr-less end, the steps of gripping the wire at first and second points spaced along the wire, increasing the distance between said points to stretch the length of wire between said points beyond the yield point of the wire, additionally gripping the stretched length of wire at a third point between the first and second points and closely adjacent to the first point while maintaining the gripping at said first and second points, and increasing the spacing between the first and third points to stretch the wire between the first and third points beyond the breaking point while maintaining the distance between the third and second points unaltered.

2. A method of producing from a continuous length of wire straight lengths of wire having burr-less tapered ends, comprising the steps claimed in claim 1 and the further steps of releasing the wire at said first, second, and third points, advancing the wire longitudinally beyond that said first point to place between the first and second points a further length of wire including a portion of said first length, gripping said further length of wire at said first and second points, increasing the spacing between the first and second points to stretch said further length beyond the yield point of the wire additionally, gripping said stretched further length of wire at said third point while maintaining the gripping at said first and second points, and increasing the spacing of said first and third points to stretch the wire between the first and third points beyond the breaking point while maintaining the distance between the third and second point unaltered, to form burr-less rear and leading ends respectively at the first length and at the further length of wire.

3. A method of threading a thin wire into a small diameter bore comprising gripping a wire at spaced first and second points so as to include a length of the wire between said points, increasing the distance between said points to stretch the wire beyond the yield point of the wire while maintaining the gripping at said first and second points, additionally gripping the stretched wire at a third point which is intermediate the first and second points and closely adjacent to the first point, and increasing the distance between the first and third points while maintaining the distance between the third and second points unaltered to stretch the wire between the first and third points beyond the breaking point, and produce a burr-less tapered end and introducing said tapered end into the bore.

4. A method of producing a straight taper-ended length of wire, comprising gripping a piece of wire at two longitudinally spaced points defining a gripped portion, increasing the spacing of said point to stretch the gripped portion beyond the yield point of the wire, additionally gripping the wire at at least one further point to obtain a shorter gripped portion of the wire intermediate said first and second points while maintaining the gripping at said first and second points, stretching said shorter portion beyond the breaking point of the wire to sever the wire at a first severing point producing a pair of tapered ends, and severing the wire at a second severing point, also intermediate said first and second points but spaced along the wire from said first severing point, also intermediate said first and second points but spaced along the wire from said first severing point according to the longitudinal dimension of the length of wire to be produced.

5. A method of producing a straight taper-ended length of wire, comprising gripping a piece of wire at two longitudinally spaced points defining a gripped portion, increasing the spacing of said points to stretch the gripped portion beyond the yield point of the wire, additionally gripping the wire at at least one further point while maintaining the gripping at said first and second points to obtain a shorter gripped portion of the wire intermediate said first and second points, stretching said shorter portion beyond the breaking point of the wire to sever the wire at a first severing point producing a pair of tapered ends, and severing the wire at a second severing point, also intermediate said first and second points but spaced along the wire from said first severing point according to the longitudinal dimension of the length of wire to be produced.

6. Apparatus for producing straight lengths of wire, comprising a first and a second pair of wire gripping jaws for gripping a wire at two longitudinally spaced points, means for increasing the mutual spacing of said two pairs of jaws to stretch such wire beyond the yield point, a third pair of wire gripping jaws for gripping such wire at a point intermediate said first and second pairs and closely adjacent to the first pair, and means for further increasing the mutual spacing of said first and second pairs to stretch the portion of the wire between the first and second pairs beyond the breaking point while leaving the mutual spacing of the second and third pairs unaltered.

7. Apparatus as claimed in claim 6, also including means for releasing all three pairs of jaws when the increase in the spacing of said first and second pairs has been completed, means for returning said jaws to their original positions, and wire-feeding means for advancing a wire, when said jaws are released, by a predetermined length in the longitudinal direction in which said jaws are spaced.

References Cited in the file of this patent

UNITED STATES PATENTS

| | | |
|---|---|---|
| 437,413 | Eckerson | Sept. 30, 1890 |
| 1,907,907 | Varney | May 9, 1933 |
| 2,075,968 | Hydekampf | Apr. 6, 1937 |
| 2,303,621 | Donnelly | Dec. 1, 1942 |
| 2,339,693 | Garnier | Jan. 18, 1944 |
| 2,393,155 | Gaspar | Jan. 15, 1946 |
| 2,502,005 | Hansell | Mar. 28, 1950 |
| 2,510,788 | Willett | June 6, 1950 |
| 2,612,063 | Wangelin | Sept. 30, 1952 |